Patented Feb. 22, 1949

2,462,388

UNITED STATES PATENT OFFICE 2,462,388

PREPARATION OF 1,4-DICYANO-2-BUTENE

Glenn F. Hager, Wilmington, Del., assignor to E. I. du Pont de Nemours & Company, Wilmington, Del., a corporation of Delaware No Drawing. Application February 13, 1947, Serial No. 728,382

11 Claims. (Cl. 260—465.8)

This invention relates to organic nitriles and more particularly to a process for preparing 1,4-dicyano-2-butene, a recently synthesized compound having the formula

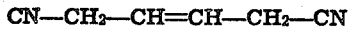

CN—CH$_2$—CH=CH—CH$_2$—CN which may also be referred to by the name $\Delta^{\beta}$-dihydromucononitrile.

Preparation of 1,4-dicyano-2-butene has been proposed by reacting a 1,4-dihalo-2-butene with an alkali or alkaline earth metal cyanide. This method is disclosed in U. S. Patent 2,342,101, issued February 22, 1944, and was successful in affording the first synthesis of the industrially important 1,4-dicyano-2-butene. However, this method has two serious disadvantages in that first, under the conditions disclosed the yields leave much to be desired and second, it requires the use as starting material of 1,4-dichloro-2-butene or 1,4-dibromo-2-butene.

It is known that limited chlorination of 1,3-butadiene, as described for example in U. S. Patents 2,038,593, issued April 28, 1936, and 2,-299,477, issued October 20, 1942, gives a mixture of 1,4-dichloro-2-butene with the isomeric 3,4-dichloro-1-butene, the latter being formed in very substantial amounts which usually equal or exceed the amount of the 1,4-isomer (Muskat and Northrup, J. Am. Chem. Soc. 52, 4043, (1930)). Since chlorination of butadiene is an economical method of preparing the dischlorobutenes, it is highly desirable to find a route to 1,4-dicyano-2-butene permitting the use as starting material of either 1,4-dichloro-2-butene or 3,4-dichloro-1-butene or their mixtures, such as are obtained directly by chlorination of 1,3-butadiene.

It is an object of this invention to provide a process for preparing 1,4-dicyano-2-butene in high yields from 1,4-dichloro-2-butene. A further object is to provide a process for preparing 1,4-dicyano-2-butene from 3,4-dichloro-1-butene or mixtures thereof with the isomeric 1,4-dichloro-2-butene. A still further object is to provide a process for preparing 1,4-dicyano-2-butene in high yields from a crude chlorination product of 1,3-butadiene containing a mixture of 3,4-dichloro-1-butene and 1,4-dichloro-2-butene. Another object is to provide a process for preparing 1,4-dicyano-2-butene from dibromo- and diiodobutenes corresponding to the dichlorobutenes. Other objects will appear hereinafter.

These objects are accomplished by the following invention for the preparation of 1,4-dicyano-2-butene which comprises reacting a dichloro addition product of chlorine to 1,3-butadiene, that is 1,4-dichloro-2-butene or 3,4-dichloro-1-butene or mixtures thereof, with an alkali cyanide, using as the reaction medium a liquid organic nitrile free from aliphatic unsaturation and containing dissolved therein a cuprous halide selected from the class consisting of cuprous chloride, cuprous bromide and cuprous iodide, and isolating the resulting 1,4-dicyano-2-butene.

It is highly desirable that the reaction mixture be substantially anhydrous so that the reaction is conducted under substantially moisture-free conditions. In particular, the nitrile reaction medium should not contain more than 1 or at most 2% of water. Larger amounts of water render the reaction mixture undesirably alkaline with the result that polymerization or other side-reactions occur and the yield of 1,4-dicyano-2-butene is decreased. It is also highly desirable that air (oxygen) be excluded to the extent practically feasible, so that the reaction is conducted under substantially oxygen-free conditions. The presence of oxygen decreases the yields considerably.

In order to exclude air, the reaction can be carried out throughout in an inert atmosphere, such as nitrogen. However, this purpose can also be achieved by maintaining a reaction temperature sufficiently high for the nitrile solvent to boil and reflux, so that its vapors will displace and exclude air. Both of these methods may be combined, if desired. The reaction can be carried out at superatmospheric pressure if desired, for example when a low boiling nitrile solvent is used and it is desired to increase the reaction rate by raising the temperature above the boiling point of the nitrile.

The cuprous halides which are satisfactory catalysts for the reaction in this invention are cuprous chloride, cuprous bromide and cuprous iodide. Cuprous iodide is less desirable than the other two halides since, during the working up of the reaction mixture to isolate the reaction product, there is some liberation of iodine which may be troublesome. The preferred catalyst, particularly from the economic standpoint, is cuprous chloride. It is not essental that the cuprous halide be completely dissolved in the nitrile reaction medium, although this will in general be the case when the preferred amounts of nitrile and cuprous halide are used.

Any organic nitrile free from aliphatic unsaturation which is liquid at reaction temperature and has a solvent action on the cuprous halide catalyst can be used as reaction medium in this invention. Suitable nitriles include acetonitrile, propionitrile, n-butyronitrile, valeronitrile, capronitrile, benzonitrile, malononitrile, adiponitrile, and the like. Unsaturated aliphatic nitriles, such as 1,4-dicyano-2-butene itself, are not satisfactory as the initial reaction medium. Other aliphatically unsaturated nitriles give undesired reactions, for example polymerization. The preferred nitriles are those free from aliphatic unsaturation containing solely carbon, hydrogen and nitrogen atoms and having not more than seven carbon atoms. The most preferred nitriles are the saturated aliphatic nitriles, particularly the saturated aliphatic mononitriles, having 2 to 6 carbon atoms and no other substituents in addition to the nitrile group. Acetonitrile is the cheapest and most preferred reaction medium. Mixtures of two or more nitriles can be used if desired.

Satisfactory yields from a practical standpoint are obtained by using at least two moles of alkali cyanide and at least 0.04 mole of cuprous halide per mole of dichlorobutene; the nitrile reaction medium being used in amount at least equal to the weight of the dichlorobutene with the reaction being carried out at a temperature of at least 50° C. The best results are obtained by using between 2 and 2.5 moles of alkali cyanide and between 0.06 and 0.2 mole of cuprous halide per mole of dichlorobutene and carrying out the reaction at a temperature between about 75° C. and the boiling point of the solvent in a saturated aliphatic nitrile having from 2 to 6 carbon atoms, the quantity of nitrile used being about 1.2 to about 4 times the weight of the dichlorobutene. In a preferred embodiment of the process, there is used for each mole of dichlorobutene about 2 to 2.5 moles of sodium cyanide, about 3.5 to 4 moles of acetonitrile as reaction medium and about 0.1 to 0.15 mole of cuprous chloride as catalyst, and the reaction is carried out at the refluxing point of the mixture, which is about 87–90° C.

Instead of sodium cyanide, there can be used any other alkali metal cyanide, such as lithium cyanide or potassium cyanide. Sodium cyanide is the cheapest material and it is therefore preferred.

The reaction product can be isolated by any convenient procedure. In general, it is best to first remove by filtration the solid materials (alkali halide and unreacted alkali cyanide, if any), then to distill off the nitrile solvent and finally to fractionate the 1,4-dicyano-2-butene. On a large scale, it is desirable, after the nitrile solvent has been stripped off, to wash the residual crude reaction product (as such, or redissolved in a solvent such as chloroform) with dilute hydrochloric acid prior to distillation. This operation destroys and removes the cuprous halide-nitrile addition product, which has a tendency to decompose and interfere with the distillation when a large quantity of crude reaction product is being handled.

This invention is more specifically illustrated in the following examples, in which parts are by weight unless otherwise specified.

*Example I*

A suspension of 50 parts of 98% sodium cyanide in 235 parts of acetonitrile, containing 20 parts of cuprous bromide in solution, was heated to refluxing and stirred while the air in the reactor was replaced by nitrogen. To the boiling mixture (82–85° C.) was added 62.5 parts of 1,4-dichloro-2-butene during 1.5 hours, after which stirring and refluxing was continued for 22.5 hours. The resultant slurry was filtered with suction while hot, the filter cake was washed with hot acetonitrile, and filtrate and washings combined were distilled at atmospheric pressure to remove the solvent. Distillation of the residual oil at 1 mm. pressure gave 44.1 parts of material boiling at 132–135° C. (117–118° at 0.8 mm. on slower redistillation) and melting at 75–77° C. This was pure 1,4-dicyano-2-butene, which was further identified by hydrolysis to dihydromuconic acid, M. P. 193–195° C. The yield was 83% of the theory.

*Example II*

To a stirred suspension of 51 parts of 96% sodium cyanide in a solution of 10 parts of cuprous chloride in 78 parts of acetonitrile, protected by a blanket of nitrogen, was added during 1.5 hours 62.5 parts of 3,4-dichloro-1-butene at the refluxing temperature of the reaction mixture (87–89° C.). After addition, stirring and heating was continued for 22.5 hours and the reaction product was isolated as in Example I. There was obtained 41 parts (yield 77.5%) of 1,4-dicyano-2-butene, identified as in the preceding example. Thus the yield was comparable to that obtained with 1,4-dichloro-2-butene as starting material.

*Example III*

A five-gallon enamel kettle, equipped with an anchor-type stirrer, was charged with 6077 parts of 95% sodium cyanide, 1542 parts of cuprous chloride and 7845 parts of acetonitrile. The resultant mixture was slurried by stirring, blanketed with nitrogen and heated to reflux temperature. During two hours there was added 6258 parts of an approximately 50/50 mixture of 1,4-dichloro-2-butene and 3,4-dichloro-1-butene, this mixture being the intermediate cut in the separation of the two dichlorobutenes from butadiene chlorination. After all was added, stirring and refluxing were continued for 22 hours. After cooling to 30° C., the reaction mixture was transferred to a five-gallon Nutsch filter with the aid of an additional 5900 parts of acetonitrile. The filtrate was concentrated by removal of the acetonitrile in a continuous stripping still and the residual crude reaction product was redissolved in 34000 parts of chloroform. The solution was washed first with 7800 parts of 9% hydrochloric acid, then with 7500 parts of distilled water. This washing operation removed any cuprous chloride present in the crude product in the form of a complex with acetonitrile. After removal of the chloroform in a continuous stripping still, the residual material was distilled under reduced pressure through a short fractionating column to yield 86 parts of 1-chloro-4-cyano-2-butene and 3324 parts of 1,4-dicyano-2-butene (yield 63.7% of the theory).

*Example IV*

To a stirred suspension of 51 parts of 96% sodium cyanide in 79 parts of n-butyronitrile containing 10 parts of cuprous bromide dissolved therein was added, at the refluxing temperature of the mixture (118–120° C.), 62.5 parts of 1,4-dichloro-2-butene during a period of 1.5 hours. Refluxing was continued for 4 hours after the addition and the product was isolated by filtration and distillation as in the preceding examples. There was obtained 31.8 parts (yield 60.2%) of 1,4-dicyano-2-butene, identified as in Example I.

When the experiment was carried out under similar conditions but in boiling propionitrile (reaction temperature 97–100° C.) the yield of 1,4-dicyano-2-butene, based on the 1,4-dichloro-2-butene actually reacted was 66.3% of the theoretical. In this case, however, there was recovered a rather large amount of starting material, the conversion being of the order of 30%.

In addition to the cuprous halide catalyst it is also possible to use cuprous cyanide in the conversion of 1,4-dichloro-2-butene to 1,4-dicyano-2-butene. For example, 62.5 parts of 1,4-dichloro-2-butene may be reacted under the conditions of Example I with a suspension of 51 parts of 96% sodium cyanide and 10 parts of cuprous cyanide in 78 parts of acetonitrile (cuprous cyanide, in contradistinction to cuprous chloride, bromide and iodide, is insoluble in organic nitriles). The yield of 1,4-dicyano-2-butene was 83%.

However, cuprous cyanide is completely ineffective in the treatment of 3,4-dichloro-1-butene. With this starting material, no reaction takes place. Therefore, cuprous cyanide has much more limited usefulness than the cuprous halides, since it is highly desirable that the catalyst be able to convert the mixture of 1,4-dichloro-2-butene and 3,4-dichloro-1-butene as it is obtained in the industrial chlorination of 1,3-butadiene.

Although the process has been illustrated with the dichlorobutenes, it is equally applicable to the corresponding dibromo- and diiodobutenes, that is to a dihalo addition product of a halogen of the class consisting of bromine, chlorine and iodine to 1,3-butadiene. Industrially, of course, the dibromo- and diiodobutenes do not have the importance of the chlorine derivatives. Preferred starting materials from the practical standpoint are mixtures of 1,4-dichloro-2-butene and 3,4-dichloro-1-butene, or the crude chlorination product of 1,3-butadiene, which is a mixture of 1,4-dichloro-2-butene and 3,4-dichloro-1-butene in varying proportions, with a minor amount of 1,2,3,4-tetrachlorobutane as the chief impurity.

It has been observed that the amount of cuprous halide desirable for highest yields depends in part on the amount of nitrile solvent used, in that the more nitrile is used the larger is the desirable amount of cuprous halide. Thus, with a nitrile/dichlorobutene weight ratio of about 3.8 to 1, the best yields are obtained by using between 0.13 and 0.16 moles of catalyst per mole of dichlorobutene, whereas when the nitrile/dichlorobutene weight ratio is about 1.25 to 1, a mole ratio of catalyst to dichlorobutene between 0.09 and 0.12 is sufficient for best results.

It is known that organic nitriles form with cuprous halides well-defined complexes which can be isolated (see for example, Rabaut, Bull. Soc. Chim. (3), 19, 785, (1898)). For instance, the cuprous chloride-acetonitrile complex has the composition $Cu_2Cl_2, 2CH_3CN$. These addition products are possibly the true catalysts in the process described in this invention.

If desired, minor amounts of other organic diluents such as dioxane, dibutyl ether, tetrahydrofurane, benzene, cyclohexane, methanol or ethanol may be admixed with the nitrile reaction medium. Any added diluent should be used in amount insufficient to precipitate all of the cuprous halide from its solution in the nitrile. Furthermore, it should be neutral in reaction, and in particular non-alkaline since alkalinity is detrimental to the yields.

While the reaction will proceed slowly even at room temperature, that is about 25° C., a practical reaction rate requires a temperature of at least 50° C. The preferred temperature range is from about 75° C. to the boiling point of the nitrile solvent, and still more preferably between about 75° C. and 120° C.

The reaction time varies somewhat with the reaction conditions, such as temperature. Within the preferred temperature range, the reaction is in general complete within a period of 18 to 20 hours, but substantial conversion is achieved in much less time, e. g. 5 to 12 hours.

1,4-dicyano-2-butene is of great interest as an intermediate in the preparation of products of considerable industrial importance. For example, it can be hydrogenated to hexamethylenediamine or hydrolyzed to dihydromuconic acid.

As many apparently widely different embodiments of this invention may be made without departing from the spirit and scope thereof, it is to be understood that the invention is not limited to the specific embodiments thereof except as defined in the appended claims.

I claim:
1. A process for preparing 1,4-dicyano-2-butene which comprises reacting a member selected from the group consisting of the dichloro and dibromo addition products of 1,3-butadiene with an alkali metal cyanide in a liquid organic nitrile free from aliphatic unsaturation and consisting solely of nitrile nitrogen, hydrogen atoms and not more than seven carbon atoms, said liquid organic nitrile containing dissolved therein a cuprous halide selected from the class consisting of cuprous chloride and cuprous bromide, and isolating therefrom the resulting 1,4-dicyano-2-butene.

2. A process for preparing 1,4-dicyano-2-butene which comprises reacting a dichloro addition product of 1,3-butadiene with an alkali metal cyanide in a liquid organic nitrile free from aliphatic unsaturation and consisting solely of nitrile nitrogen, hydrogen atoms and not more than seven carbon atoms, said liquid organic nitrile containing dissolved therein a cuprous halide selected from the class consisting of cuprous chloride and cuprous bromide, and isolating therefrom the resulting 1,4-dicyano-2-butene.

3. A process as set forth in claim 2 in which the alkali metal cyanide is sodium cyanide.

4. A process as set forth in claim 2 in which said liquid organic nitrile is a saturated aliphatic nitrile consisting solely of nitrile nitrogen, hydrogen atoms and not more than seven carbon atoms.

5. A process as set forth in claim 2 in which said cuprous halide is cuprous chloride.

6. A process for preparing 1,4-dicyano-2-butene which comprises reacting a dichloro addition product of 1,3-butadiene with sodium cyanide in acetonitrile, said acetonitrile containing dissolved therein cuprous chloride, and isolating therefrom the resulting 1,4-dicyano-2-butene.

7. A process for preparing 1,4-dicyano-2-butene which comprises reacting 3,4-dichloro-1-butene with an alkali metal cyanide in a liquid organic nitrile free from aliphatic unsaturation and consisting solely of nitrile nitrogen, hydrogen atoms and not more than seven carbon atoms, said liquid organic nitrile containing dissolved therein cuprous chloride, and isolating therefrom the resulting 1,4-dicyano-2-butene.

8. A process for preparing 1,4-dicyano-2-butene which comprises reacting 3,4-dichloro-1-butene with sodium cyanide in acetonitrile, said acetonitrile containing dissolved therein cuprous chloride and isolating therefrom the resulting 1,4-dicyano-2-butene.

9. A process for preparing 1,4-dicyano-2-butene which comprises reacting 1,4-dichloro-2-butene with an alkali metal cyanide in a liquid organic nitrile free from aliphatic unsaturation and consisting solely of nitrile nitrogen, hydrogen atoms and not more than seven carbon atoms, said liquid organic nitrile containing dissolved therein a cuprous halide selected from the class consisting of cuprous chloride and cuprous bromide, and isolating therefrom the resulting 1,4-dicyano-2-butene.

10. A process for preparing 1,4-dicyano-2-butene which comprises reacting 1,4-dichloro-2-butene with sodium cyanide in acetonitrile, said acetonitrile containing dissolved therein a cuprous halide selected from the class consisting of cuprous chloride and cuprous bromide, and isolating therefrom the resulting 1,4-dicyano-2-butene.

11. A process for preparing 1,4-dicyano-2-butene which comprises reacting 1,4-dichloro-2-butene with sodium cyanide in n-butyronitrile, said n-butyronitrile containing dissolved therein cuprous bromide, and isolating therefrom the resulting 1,4-dicyano-2-butene.

GLENN F. HAGER.

REFERENCES CITED

The following references are of record in the file of this patent:

UNITED STATES PATENTS

| Number | Name | Date |
|---|---|---|
| 2,242,084 | Nicodemus et al. | May 13, 1941 |
| 2,342,101 | Cass et al. | Feb. 22, 1944 |
| 2,384,630 | Mahan | Sept. 11, 1945 |
| 2,422,252 | Otto | June 17, 1947 |

FOREIGN PATENTS

| Number | Country | Date |
|---|---|---|
| 333,989 | Great Britain | Aug. 28, 1930 |